W. H. FOX.
Railroad-Velocipede.
No. 225,585. Patented Mar. 16, 1880.
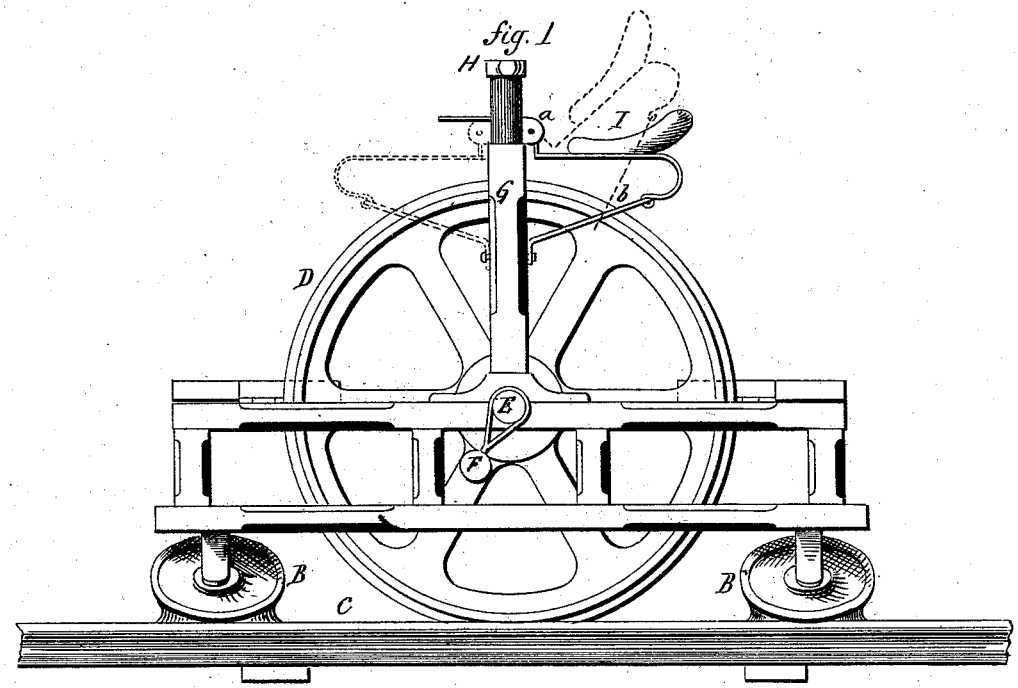
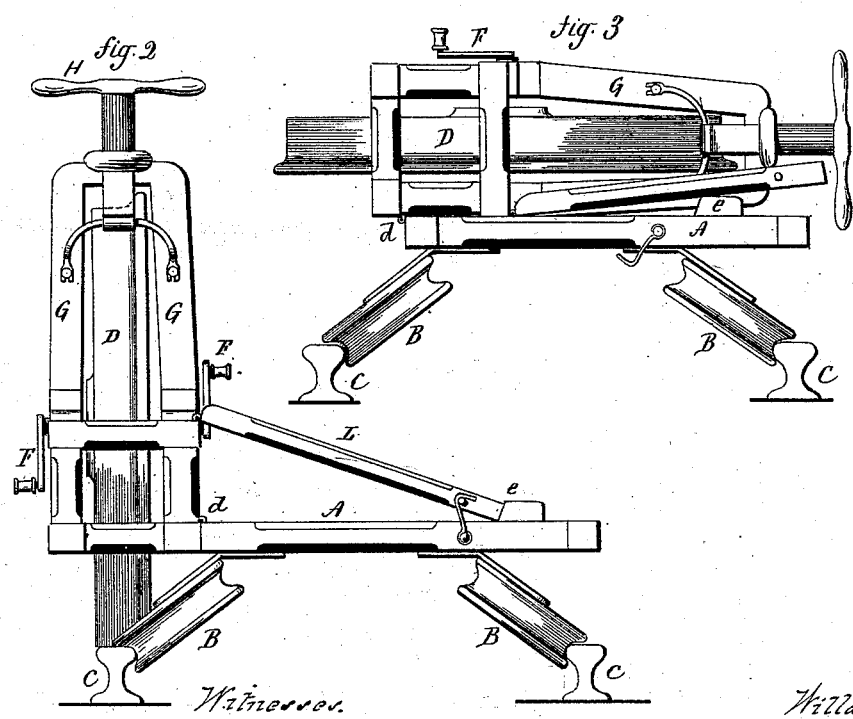

UNITED STATES PATENT OFFICE.

WILLARD H. FOX, OF NEW HAVEN, CONNECTICUT.

RAILROAD-VELOCIPEDE.

SPECIFICATION forming part of Letters Patent No. 225,585, dated March 16, 1880.

Application filed January 7, 1880.

*To all whom it may concern:*

Be it known that I, WILLARD H. FOX, of New Haven, in the county of New Haven and State of Connecticut, have invented a new Railroad-Velocipede; and I do hereby declare the following, when taken in connection with the accompanying drawings and the letters of reference marked thereon, to be a full, clear, and exact description of the same, and which said drawings constitute part of this specification, and represent, in—

Figure 1, side view of the velocipede as set upon the track for operation; Fig. 2, end view of same; Fig. 3, end view in its folded or contracted condition.

This invention relates to the construction of velocipedes to be used on railway-tracks for the convenience of employés and as a substitute for the common hand-car; and the invention consists in the construction, as hereinafter described, and particularly recited in the claims.

A is the platform, supported on diagonal wheels B, the said wheels grooved so as to rest upon the two rails C of the common railway.

D is the drive-wheel, which may be flanged, as shown, or flat faced. This wheel is supported on an axis, E, arranged in suitable bearings in the frame-work and so as to revolve with the wheel. On each end of the axle is a foot-crank, F.

From the platform uprights G extend over the wheel, crowned by a transverse hand-piece, H, and to the upright a saddle, I, is attached, so that a person may sit thereon and place his feet on the cranks F F to drive the wheel D in the usual manner of driving a common velocipede or bicycle.

The platform A serves as a place for carrying tools, or for other persons to ride upon.

The inclined position of the wheels B prevents the possibility of running off the track, and serves also as a balance to keep the drive-wheel in its vertical position.

The hand-piece H is stationary, and serves only as a convenience for the rider to support himself.

To enable the machine to be conveniently run in either direction, the saddle I is hinged to the upright, as at *a*, and the hinge is swiveled to the upright, so that the seat may be turned around in horizontal plane, as from the position seen in Fig. 1 to broken lines, same figure.

The object of the hinge *a* is to enable the seat to be turned up, so that its supporting-brace *b* may be passed over the wheel, as seen in broken lines.

For the convenience of removing the machine from the track, and in order to bring the drive-wheel into a central or balance position, the platform is divided and hinged together at *d*, so that the drive-wheel and the frame-work which support it and the upright may be turned over onto the platform, as seen in Fig. 3, which brings the drive-wheel nearly into a central or balance position on the platform.

To support the wheel in its upright position a brace or braces, L, are hinged to the uprights and arranged to take a bearing on the platform, as at *e*, and when desired to turn the wheel down onto the platform the brace is lifted from its bearing *e* and allowed to slip over it, as seen in Fig. 3.

This invention permits a construction much lighter and cheaper than the common hand-car, more convenient, and more easily driven.

I claim—

1. The platform A, provided with diagonal wheels B, the drive-wheel D, provided with foot-cranks, and the saddle I, substantially as and for the purpose described.

2. The platform A, provided with diagonal wheels B, the drive-wheel D, provided with foot-cranks, and the saddle I, arranged to be reversed in its position over the wheel, substantially as described.

3. The platform A, supported on diagonal wheels B, with the driving-wheel D, provided with foot-cranks and hung in supports hinged to the platform A, and so as to be turned down thereon, substantially as described.

WILLARD H. FOX.

Witnesses:
JOHN E. EARLE,
JOS. C. EARLE.